May 5, 1970   F. J. FUCHS, JR   3,509,785
METHODS OF DEEP DRAWING SOLID PLASTIC MATERIAL
Filed Nov. 4, 1966   6 Sheets-Sheet 1
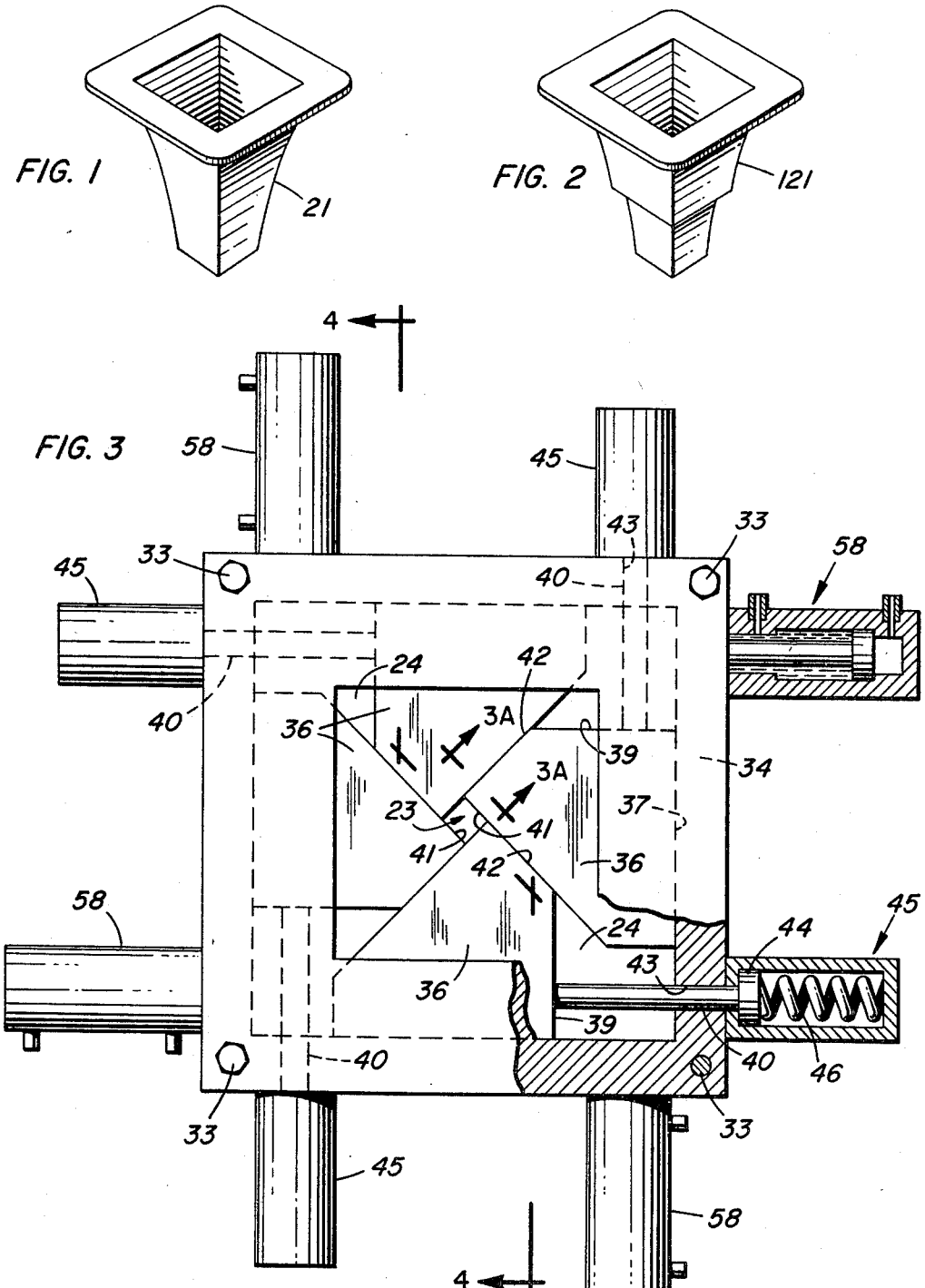
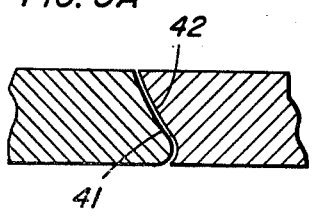
INVENTOR
*F. J. FUCHS, JR.*
BY MARN & JANGARATHIS
ATTORNEYS May 5, 1970  F. J. FUCHS, JR  3,509,785
METHODS OF DEEP DRAWING SOLID PLASTIC MATERIAL
Filed Nov. 4, 1966  6 Sheets-Sheet 2

May 5, 1970   F. J. FUCHS, JR   3,509,785
METHODS OF DEEP DRAWING SOLID PLASTIC MATERIAL
Filed Nov. 4, 1966   6 Sheets-Sheet 3

May 5, 1970  F. J. FUCHS, JR  3,509,785
METHODS OF DEEP DRAWING SOLID PLASTIC MATERIAL
Filed Nov. 4, 1966  6 Sheets-Sheet 4

United States Patent Office 3,509,785
Patented May 5, 1970

3,509,785
METHODS OF DEEP DRAWING SOLID PLASTIC MATERIAL
Francis Joseph Fuchs, Jr., Princeton Junction, N.J., assignor to Western Electric Company, Incorporated, New York, N.Y., a corporation of New York
Filed Nov. 4, 1966, Ser. No. 592,143
Int. Cl. B21d 22/00
U.S. Cl. 72—60           15 Claims

ABSTRACT OF THE DISCLOSURE

Method of deep drawing solid plastic material by exerting pressure against the circumferential surface of a blank to be drawn, the pressure being sufficiently large in magnitude to increase the ductility of the blank material, and thereafter drawing the increasingly ductile blank material through a die. Disclosed methods of deep drawing include, in various combinations, the steps of exerting pressure against the circumferential surface of the blank, both by mechanical and by fluid means, varying the size of the die opening during drawing to draw articles of varying cross-sectional configuration as well as articles having stepped walls, and controlling the wall thickness of the article being drawn.

---

It is known by those skilled in the art, that many metals and other materials increase in ductility, or have an increased capacity for deformation without fracture, when they are subjected to high hydrostatic pressure. These metals and other materials are known as "solid plastic materials." This principle is treated in P. W. Bridgman, "Large Plastic Flow and Fracture," published by McGraw-Hill Book Company of New York in 1952. Accordingly, it will be understood that the expression "solid plastic material" as used in this specification and claims, is used in this context.

In the cold forming of ductile materials, the amount of deep drawing possible is limited by the tendency of such materials to fracture, or to thin out unevenly in localized areas. This problem is compounded when an attempt is made to deep draw articles of varying cross-sectional configuration while maintaining a constant, or relatively even or uniform, material thickness in the walls of the drawn article.

The prior art methods of deep drawing typically include several successive drawing operations which generally require intermediate annealing steps to remove the unwanted, and sometimes ruinous, effects of work hardening. Further, such prior art deep drawing methods, when the article to be drawn is to have a varying cross-sectional configuration, require that a plurality of dies be used for each drawing operation, or that the drawing operation be interrupted in order to manually change the size of a variable opening die. These prior art deep drawing methods are time consuming when utilized to deep draw ductile material, and are even more expensive and time consuming when utilized to draw less ductile or brittle materials.

Furthermore, no prior art methods has proven to be entirely satisfactory when employed to deep draw articles of gradually varying shape, particularly where it is desired to maintain the article wall thickness constant, or relatively even or uniform. The well known technque of stretch-drawing, for example, can often result in unwanted, uneven, and even ruinous, thinning of the walls of the deep drawn material.

Accordingly, it is an object of the present invention to provide new methods of deep drawing solid plastic material.

It is another object of the present invention to provide methods of deep drawing blanks of solid plastic material into articles of varying cross-sectional configuration.

It is a further object of this invention to provide methods of deep drawing blanks of solid plastic material into articles of varying cross-sectional configuration and for controlling the wall thickness of the drawn articles.

A method embodying certain features of the present invention and satisfying the foregoing objects, includes the steps of subjecting a blank of solid plastic material to high hydrostatic pressure sufficiently great to cause said blank to increase in ductility, and forcing said increasingly ductile blank through a variable opening die while varying the opening of the die as the blank is being drawn therethrough.

A more complete understanding of the present invention may be obtained from the following detailed description when read in conjunction with the appended drawings, wherein:

FIG. 1 is a perspective view of a deep drawn member of varying cross-sectional configuration which may be drawn by certain methods of the present invention;

FIG. 2 is a perspective view of a stepped tubular member which may be drawn by certain methods of the present invention;

FIG. 3 is a plan view, partly in section, of an adjustable iris die assembly which may be employed in the practice of the methods of the present invention;

FIG. 3A is a fragmentary sectional view showing the manner of complementary engagement of certain edges of the dies;

Referring now to FIG. 1, there is shown a horn-shaped article 21, such as for example, a transmitting horn for use in a microwave system. The article is provided with a flange portion and a body portion of varying cross-sectional configuration. The horn-shaped article 121, shown in FIG. 2, is similar to the article of FIG. 1, but is further provided with a stepped portion intermediate the body portion of varying cross-sectional configuration. Such articles are examples of articles which may be formed by the methods of the present invention.

Figure 4:
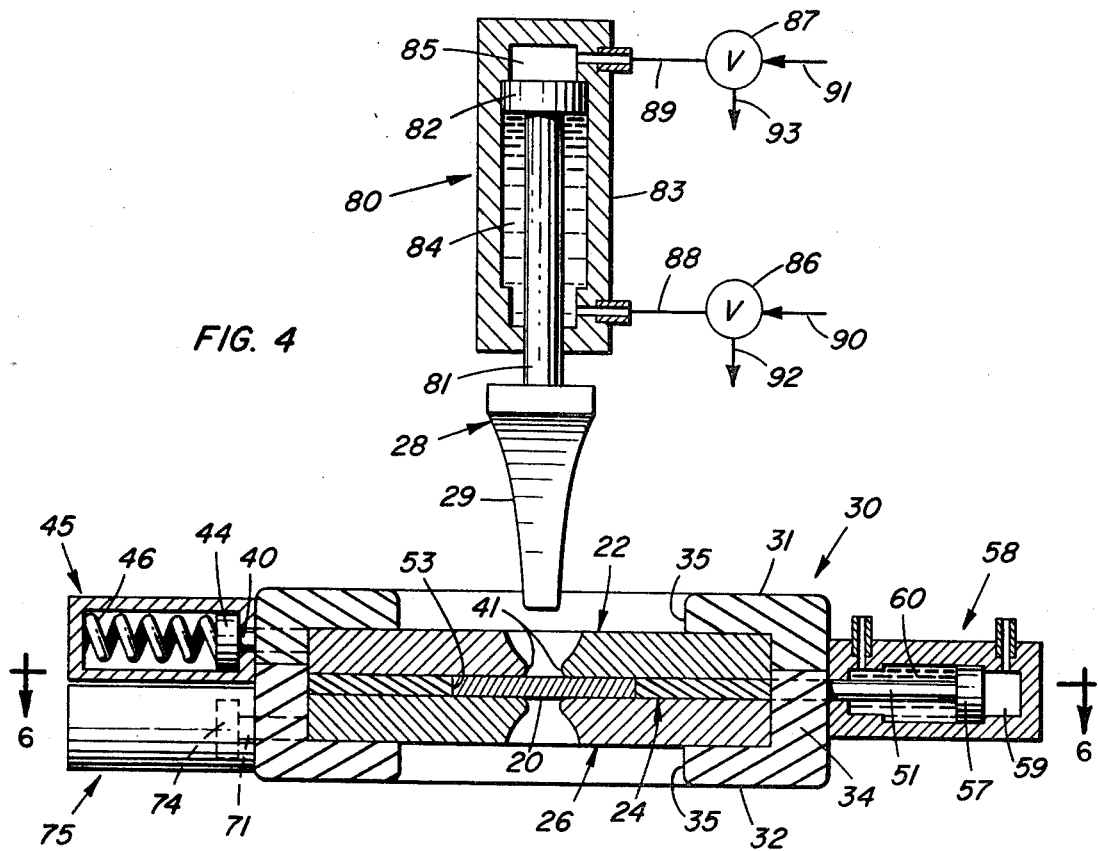
FIG. 4 is an elevational view, partly in section, of the assembly of FIG. 3 and additional structure, the sectional view being taken substantially along the irregular line 4—4 of FIG. 3 in the direction of the arrows.

As mentioned generally above, the apparatus shown in FIGS. 3 through 7 is suitable for practicing certain methods of the present invention, and which methods may be used to deep draw the horn-shaped article 21 of FIG. 1 from a blank of solid plastic material, such as for example, the planar undrawn blank of solid plastic material 20, shown in FIG. 4.

The apparatus generally, and as may be best seen in FIG. 4, comprises a spring loaded, hold-down, iris die 22; a fluid actuated, edge-pressure, iris die 24; a spring loaded, forming, iris die 26; and a fluid driven mandrel 28.

Figure 5:
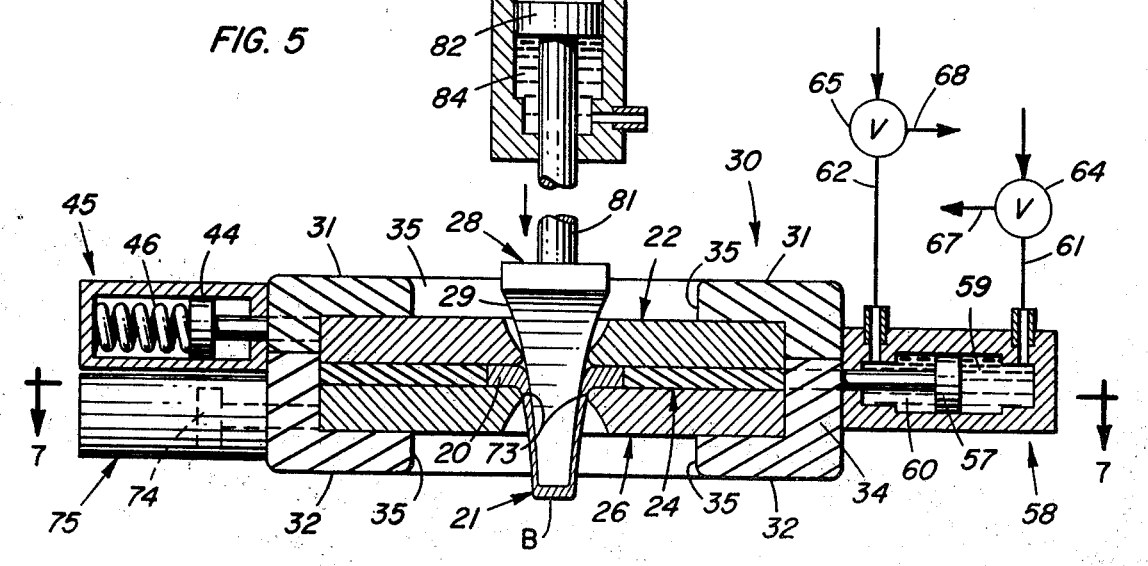
FIG. 5 is a view, similar to FIG. 4 and illustrating, diagrammatically, a deep drawing step of the methods of the present invention.

The hold-down, iris die 22; the edge-pressure, iris die 24; and the forming, iris die 26 are mounted for reciprocable, relative sliding movement, within a split supporting frame 30; which frame is comprised of an upper section 31 and lower section 32, suitably fastened together such as by bolts 33 (FIG. 3). The assembled split frame 30, as shown in FIGS. 4 and 5, includes a vertical wall 34 for positioning the dies with respect to each other, and inwardly extending, top and bottom flanges 35 for providing lateral support to the dies. The inwardly extending flange 35 of the upper frame section 31, covers only a portion of the hold-down, iris die 22 so as to accommodate or permit the introduction of the mandrel 28 into the dies, for the purpose and in a manner which is set forth in detail infra. Similarly, the inwardly extending lower flange 35 covers only a portion of the forming iris die 26 so as to accommodate or permit the downward extension of the mandrel 28, and deep drawn article, through the frame 34.

The hold-down, iris die 22, as shown in FIG. 3, comprises four die blocks 36 which are slidably mounted in the frame 30. Each of the die blocks 36 is provided with: (i) a sliding edge 37 which slidingly abuts and is guided by the inner surface of the frame wall 34; (ii) a force edge 39 which is suitably secured to and coacts with a force transmitting shaft 40; (iii) a die edge 41 which is to be slidingly engaged by a curved surface 29 of the mandrel 28; and (iv) a support edge 42 for slidingly engaging the die edge of another die block 36.

The die edges 41 form, cooperatively, an expandable, iris die opening 23, as shown in FIG. 3; and the die edges 41 and the support edges 42 are shaped in complementary configuration as shown in FIG. 3A. The shafts 40 are slidably received in, and extend through, apertures 43 formed in the frame wall 34. The outer end of each shaft 40 is provided with an enlarged head 44 which is slidably received within a cylinder 45 suitably secured to the outer surface of the frame wall 34. Residing within each cylinder 45, is a compression spring 46 which engages the shaft head 44 residing in the cylinder, and through the associated shaft 40, urges or biases the associated die block 36 inwardly of the frame 30. Normally, i.e., prior to the entry of the mandrel 28 into the iris die opening 23, the compression spring 46 moves the die blocks 36 into their extreme inward positions of the frame 30, at which positions the die edges 41 define the smallest, or most closed, iris die opening. Upon the entry of the mandrel 28 into the iris die opening 23, the curved mandrel surfaces 29 engage the die edges 41, and upon the downward movement of the mandrel, the curved mandrel edges force the die blocks 36 outwardly thereby opening or enlarging the iris die opening 23; the iris die opening 23 at all times conforming to the outer surface of the downwardly moving mandrel at the points of engagement of the curved mandrel surfaces 29 with the die edges 41.

Figure 6:
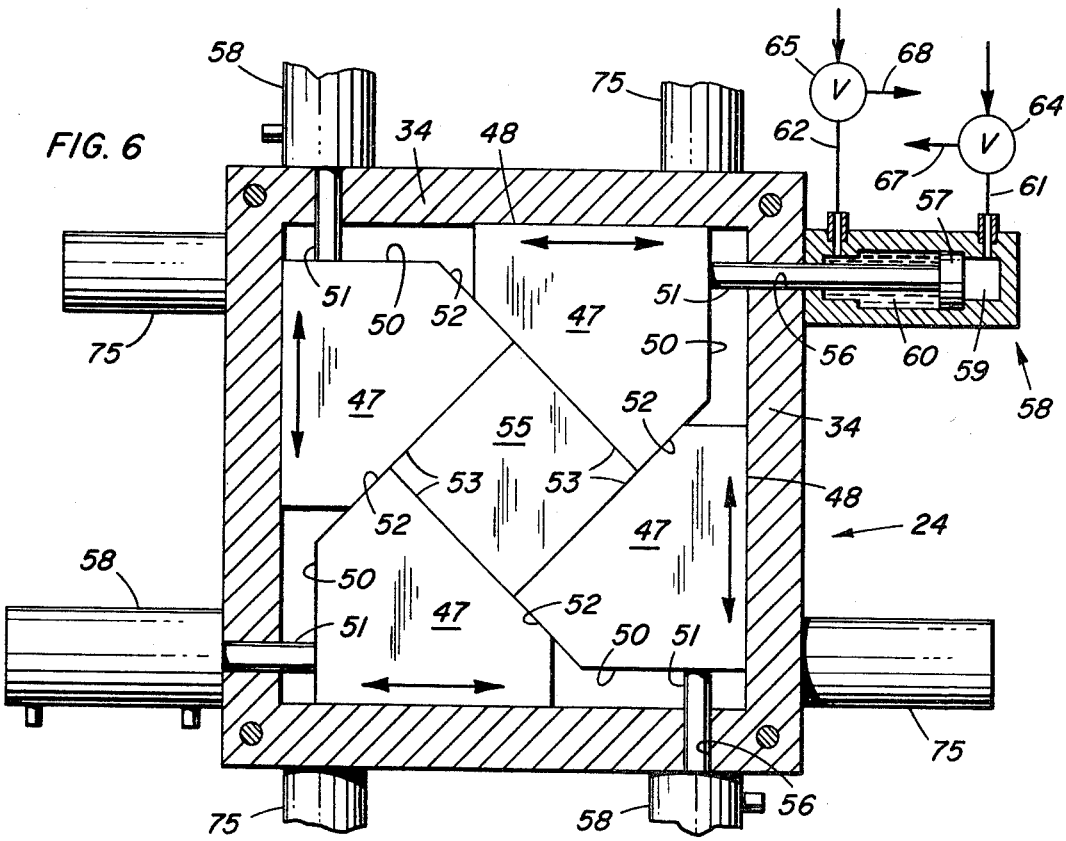
FIG. 6 is a sectional view taken substantially along the line 6—6 of FIG. 4 in the direction of the arrows.

The edge-pressure, iris die 24, as shown in FIG. 6, also comprises four die blocks 47, which die blocks are slidably mounted in the frame 30. Each of the die blocks 47 is provided with: (i) a sliding edge 48 which slidingly abuts and is guided by the inner surface of the frame wall 34; (ii) a force edge 50 which is secured to and coacts with a force transmitting shaft 51; (iii) a support edge 52; and (iv) a die edge 53 for engaging the circumferential surface or edge of the blank 20 and other die blocks. The die edges 53 form, cooperatively, a contractable iris die 55 as shown in FIG. 6.

The shafts 51 of the die blocks 47 are slidably received in and extend through apertures 56 formed in the frame wall 34. The outer end of each shaft is provided with an enlarged head or piston 57 which is slidably received within a double acting cylinder 58 suitably secured to the outer surface of the frame wall 34. The piston 57 divides the interior of the cylinder into two chambers, 59 and 60, respectively.

The chambers 59 and 60 are connected to suitable supplies of pressurized fluid (not shown) by supply lines 61 and 62, respectively, and through intermediate two-way control valves 64 and 65, respectively. The control valves are also connected to respective relief lines 67 and 68. When the control valve 64 is aligned to admit pressurized fluid into the chamber 59, the control valve 65 is aligned to relieve fluid from the chamber 60 into the relief line 68. Conversely, when the control valve 65 is aligned to admit pressurized fluid into chamber 60, the control valve 64 is aligned to relieve fluid from the chamber 59 into the relief line 67. When fluid pressure builds up suitably in the cylinder chambers 59, and the cylinder chambers 60 are relieved, the pistons 54 are forced toward the frame 34, and through the shafts 51, the pistons move the die blocks 47 inwardly of the frame 30. The die blocks slide relative of each other, moving the opposed die edges 53 toward each other thereby contracting the iris die 55. The iris die 55 is opened or expanded by relieving the cylinder chambers 59, and by admitting pressurized fluid into the cylinder chambers 60.

Figure 7:
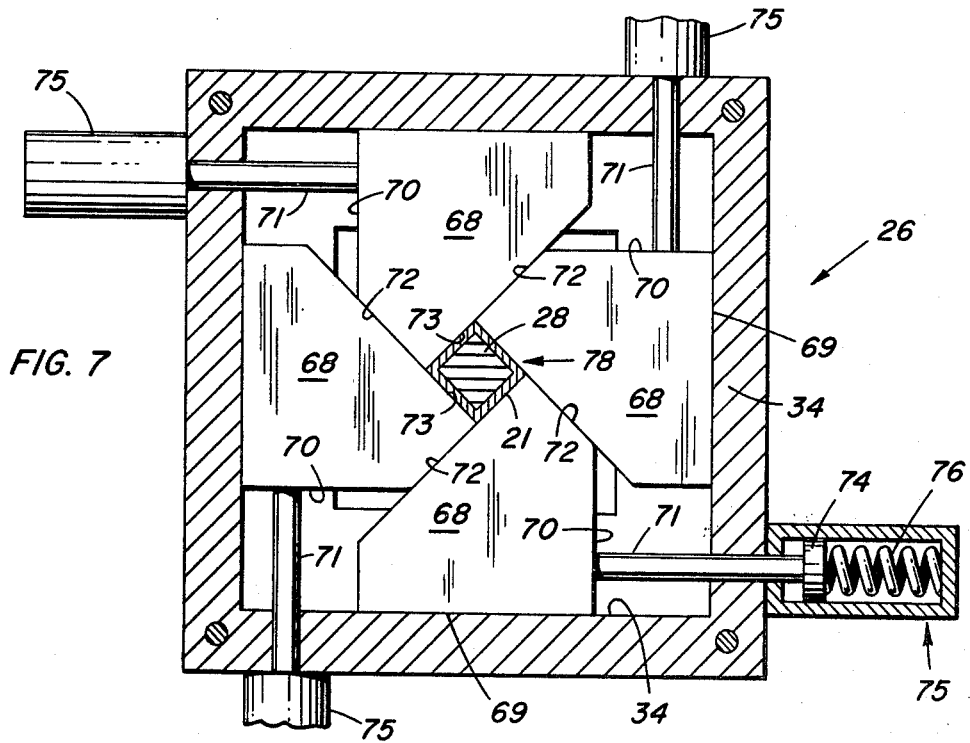
FIG. 7 is a sectional view taken, substantially along the line 7—7 of FIG. 5, in the direction of the arrows.

Referring now to FIGS. 4, 5 and 7, and in particular FIG. 7, it can be seen that the structure of the forming, iris die 26 is the same as that of the hold-down, iris die 22. Thus, the forming iris die 26 comprises four die blocks 68 which are slidably mounted in the frame 30. Each of the die blocks 68 is provided with: (i) a sliding edge 69 which slidingly abuts and is guided by the inner surface of frame wall 34; (ii) a force edge 70 which is suitably secured to and coacts with a force transmitting shaft 71; (iii) a support edge 72; and (iv) a forming die edge 73 which slidingly engages the support edge of another die block in the manner illustrated in FIG. 3A. The die edges 73 form, cooperatively, an expandable, forming, iris die opening 78.

The die blocks 68 are slidably supported and spring biased in the same manner as previously described in connection with the die blocks 36. More specifically as shown in FIG. 7, the shafts 71 extend slidably through the frame wall 34 and are provided with enlarged head portions 74 which are slidably received in cylinders 75 suitably secured to the outer surface of the frame 34. Each head portion 74 is in operative engagement with a compression spring 76 residing within the cylinder 75. The compression springs 76 urge or bias the die blocks 68 inwardly of the frame 30, and the die edges 71 form, cooperatively, an expandable iris die opening 78, as shown in FIG. 7. The die edges 73, in cooperation with the mandrel 28 and edge-pressure, iris die 24 (FIG. 5), deform and shape the article to be deep drawn in a manner to be described in detail infra.

The mandrel 28 as is best shown in FIG. 4, is positioned and mounted for advancement into and retraction out of the iris die openings formed by the hold-down, iris die 22, the edge-pressure, iris die 24, and the forming iris die 26. An operating mechanism 80 controls the advancement and retraction of the mandrel with respect to the iris dies. The mandrel forming surfaces 29 correspond complementarily to the desired internal configuration of the article to be deep drawn, for example, the mandrel surfaces 29 of the embodiment shown are provided with a gradual curve complementary to the internal configuration of the horn-shaped article 21 of FIG. 1.

The mandrel operating mechanism 80, which controls axial movement of the mandrel 28 along an axis perpendicular to the aligned iris die openings and the plane of the undrawn blank 20, comprises a shaft 81 which connects mandrel 28 to a piston 82, which piston is slidably received within a double acting cylinder 83. The piston divides the cylinder 83 into two chambers 84 and 85, respectively. The chambers are connected to suitable supplies of pressurized fluid (not shown) by supply lines 88 and 89, respectively, and through intermediate two-way control valves 86 and 87, respectively. The control valves are also connected to respective relief lines 92 and 93. The control valves 92 and 93 operate in the same functional relationship as the above-described functional relationship between control valves 64 and 65. When fluid pressure builds up suitably in the cylinder chamber 85, and the cylinder chamber 84 is relieved, the piston 82 is forced downwardly, and through the shaft 81, forces the mandrel 28 into engagement with the blank 20 and into the above-described iris dies. To retract the mandrel, the alignments of the control valves 86 and 87 are reversed, and pressurized fluid is admitted into the cylinder chamber 84.

OPERATION OF THE APPARATUS OF FIGS. 3–7 IN PRACTICING CERTAIN METHODS OF THE PRESENT INVENTION

Referring now to FIGS. 4 and 5, it will be assumed that a blank of solid plastic material 20 has been positioned in the edge-pressure, iris die 24, and between the hold-down, iris die 22 and the forming, iris die 26. This will be accomplished by separating the upper and lower frame sections 31 and 32 of the split frame 30, and by placing the blank on the forming, iris die 26 and within the iris die opening 55 of the edge-pressure, iris die 24, and further, by placing the hold-down, iris die on top of the blank, by reassembling and aligning the upper and lower frame sections, and by rigidly securing them together with the bolts 33. It will be further assumed that the structural elements occupy the positions shown in FIG. 4.

The control valves 64 and 65, associated with the edge-pressure, iris die (FIG. 6), will be aligned to relieve the cylinder chambers 60 and to admit pressurized fluid into the cylinder chambers 59. As fluid pressure builds up in the fluid chambers 59, the edge-pressure, iris die 55 begins to contract, as described above, and the iris die edges 53 engage the circumferential surface or edges of the blank 20 and begin to exert edge pressure against the blank. Simultaneously, or in a predetermined time sequence, the control valves 86 and 87, associated with the mandrel 28, are aligned to relieve the chamber 84 and to admit pressurized fluid into the cylinder chamber 85. As pressure builds up in the chamber 85, the piston 82 and shaft 81 are forced downwardly, moving the mandrel 28 downwardly. The downwardly moving mandrel enters the hold-down, iris die opening 43, engages a central portion of the blank 20, and deflects the central portion downwardly into the forming, iris die opening 78.

Additional pressurized fluid is admitted into the mandrel cylinder chamber 85 and into the edge-pressure cylinder chambers 59, to respectively force the mandrel 28 continually downwardly and the edge-pressure die blocks 47 continually inwardly of the frame 30, thereby contracting the edge-pressure, iris die 55. The advancing edge-pressure, iris die blocks 47, or contracting iris die 55, apply pressure against the circumferential surface or edges of the blank. The downwardly advancing tapered mandrel, after deflecting the central portion of the blank into the forming, iris die opening 78, applies a force, or pressure, to the blank in opposition to, or in substantial opposition to, the force or pressure applied to the blank by the edge-pressure, iris die blocks 47. The hold-down, iris die 22, and the forming iris die 26, confine the upper and lower surfaces of the blank, and thus, as the confined blank is subjected to opposing forces, or pressures, the blank tends to expand upwardly and downwardly. The confining hold-down, iris die and forming, iris die prevent such blank expansion by applying reactive forces against the upper and lower surfaces of the blank. The combination of the applied and reactive forces is sufficiently great to place the blank in high hydrostatic pressure and to cause the blank to increase inductility sufficiently to permit the blank to deform without fracture, and to flow between the opening between the tapered surfaces 29 of the mandrel and the forming die edges 73 of the forming, iris die 26, FIG. 5.

Figure 5A:
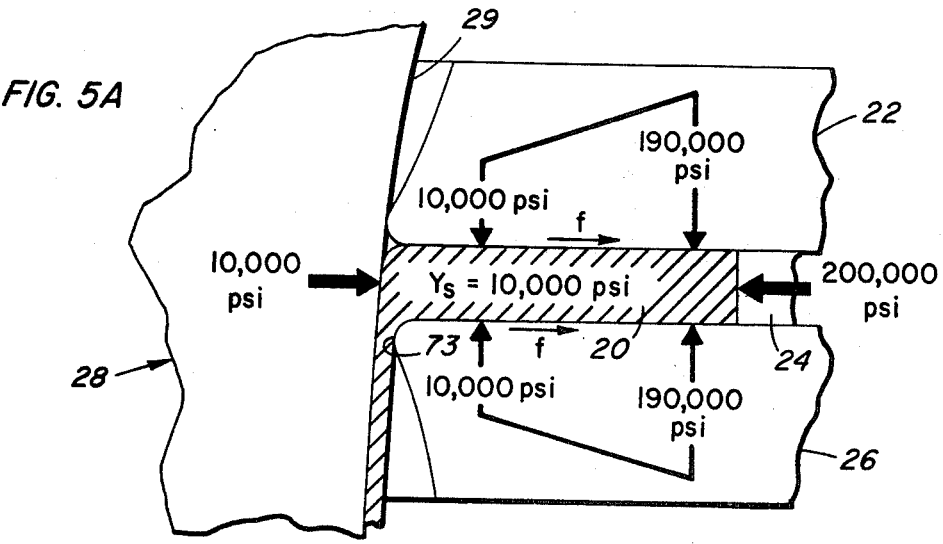
FIG. 5A is a diagrammatic representation of a force system achieved when certain methods of the present invention are practiced.

More specifically, FIG. 5A is a diagrammatic representation of a force system achieved when certain methods of the present invention were utilized to deep draw a blank of copper having a yield strength of 10,000 p.s.i. The blank was confined between the hold-down, iris die 22 and the forming, iris die 26. The edge-pressure, iris die 24 applied a pressure of 200,000 p.s.i. against the circumferential edges or surface of the blank. The yield strength ($Y_s$) of the blank accommodated 10,000 p.s.i. of the applied pressure, and 180,000 p.s.i. were lost in overcoming the frictional forces between the blank 20 and the bottom and top surfaces of the hold-down and forming iris dies, respectively; this frictional loss being indicated by the top and bottom force gradients shown varying between 190,000 p.s.i. and 10,000 p.s.i. The tapered mandrel applied a pressure of 10,000 p.s.i. to the blank, and the hold-down die and forming die each applied reactive pressures of 10,000 p.s.i. to the blank. The applied net 10,000 p.s.i. placed the blank in high hydrostatic pressure, and increased the ductility of the blank sufficiently to cause the blank to flow between the space between the tapered surfaces of the adjoining mandrel 28 and the forming edges 73 of the expanding, forming iris die 26. It will be understood by those skilled in the art, that the above-described force system is indicative of a static condition, and that at least slightly more than a net 10,000 p.s.i. must be applied to the copper blank to overcome the yield strength of the blank and to place the blank in high hydrostatic pressure and to cause flow of the material, or to cause the blank to increase in ductility sufficiently to permit the blank to be deep drawn without fracture. It will be further understood, that the spacing or opening between the mandrel and the forming iris die causes an imbalance in the force system, which in turn causes the ductile blank to flow between the mandrel and forming, iris die.

Referring again to FIG. 5, it will be further understood, that the continually advancing mandrel 28, and the continually contracting edge-pressure, iris die 26, and the hold-down and forming, iris dies 24 and 26, respectively, will maintain at least the undrawn portion of the blank in high hydrostatic pressure, and hence increasingly ductile, and will cause the increasingly ductile blank to flow into the space between the tapered surfaces 29 of the mandrel 28 and the forming edges 73 of the forming, iris die 26. The advancing tapered mandrel, and the blank material flowing into the space between the mandrel and forming die edges 73, will force the forming die blocks 68 outwardly, against the action of the compression springs 76, thereby expanding the forming, iris die opening 78. Thus, the forming die edges 73, of the expanding, forming, iris die 26, form or shape the increasingly ductile, flowing blank material, against the tapered surfaces 29 of the advancing mandrel 28, and hence into an article of varying cross-sectional configuration.

The compression springs 76 (FIG. 7), associated with the forming die blocks 68, are of predetermined strength or stiffness so as to maintain a constant, or relatively even or uniform spacing between the forming die edges 73 and the tapered surfaces of the advancing mandrel 29 and yet, permit the advancing mandrel and flowing blank material to force the die blocks 68 outwardly to expand the forming, iris die 26. Further, as may be seen from FIG. 5, the compression springs 76 maintain the spacing between the tapered mandrel surfaces 29 and the expanding, forming, iris die 26, at a predetermined distance less than the thickness of the undrawn blank 20. Thus, the walls of the drawn article are controlled by being maintained constant, or relatively even or uniform.

It will be further understood, that the tapered surfaces 29 of the advancing mandrel 28 expand the hold-down, iris die 22 during the drawing operation, and that the compression springs 46 associated with the hold-down, die blocks 32, maintain the die edges 41 of the hold-down die 22 in constant contact with the tapered mandrel surfaces 29 as the mandrel advances.

Summarizing briefly, it will be appreciated by those skilled in the art, that the mandrel 28, hold-down iris die 22, edge pressure iris die 24, and forming iris die 26, provide cooperatively a chamber of decreasing size for confining the blank of solid plastic material and for placing the material in high hydrostatic pressure sufficiently great to cause the blank to increase in ductility to permit the desired deep drawing without fracture of the blank. Further, that the expandable hold-down and forming iris dies constantly support the upper and lower surfaces of the blank as the tapered mandrel is advanced continuously into the iris dies to draw the blank, and thus, the hold-down and forming iris dies provide the aforementioned reactive forces uniformly over the upper and lower surfaces of the diminishing in size, undrawn blank. Additionally, that the forming die edges 73, of the expandable, forming, iris die 26, form or shape the flowing ductile material against the tapered surfaces of the advancing mandrel, and thus provide the drawn article with an internal configuration complementary to the external configuration of the mandrel 28, such as for example, the horn-shaped article 21 of FIG. 1, having the aforementioned varying cross-sectional configuration.

It will be further understood by those skilled in the art, that if it is desired to provide the deep drawn article with a laterally extending flange portion as that provided to the horn-shaped article 21 of FIG. 1, the entire blank of solid plastic material 20, as shown in FIG. 5, will not be exhausted in deep drawing, but instead the deep drawing operation will be stopped with predetermined portions of the undrawn blank remaining between the hold-down, and forming, iris dies. This is accomplished by appropriately aligning at predetermined times, the mandrel control valves 86 and 87, and the edge-pressure, iris die control valves 64 and 65, to halt the downward movement of the mandrel 28 and the inward movement of the edge-pressure, iris die blocks 47, at predetermined positions.

Upon completion of the deep drawing operation, the mandrel 28 will be retracted as taught above, the edge-pressure, iris die 24 will be expanded as taught above, and the frame 30 will be disassembled by removing the bolts 33 thereby providing ready access to the deep drawn article for suitable removal.

If it is desired to remove the bottom portion B of the deep drawn article shown in FIG. 5, the bottom portion B may be suitably removed by any one of several punching methods well-known in the art.

Figure 8:
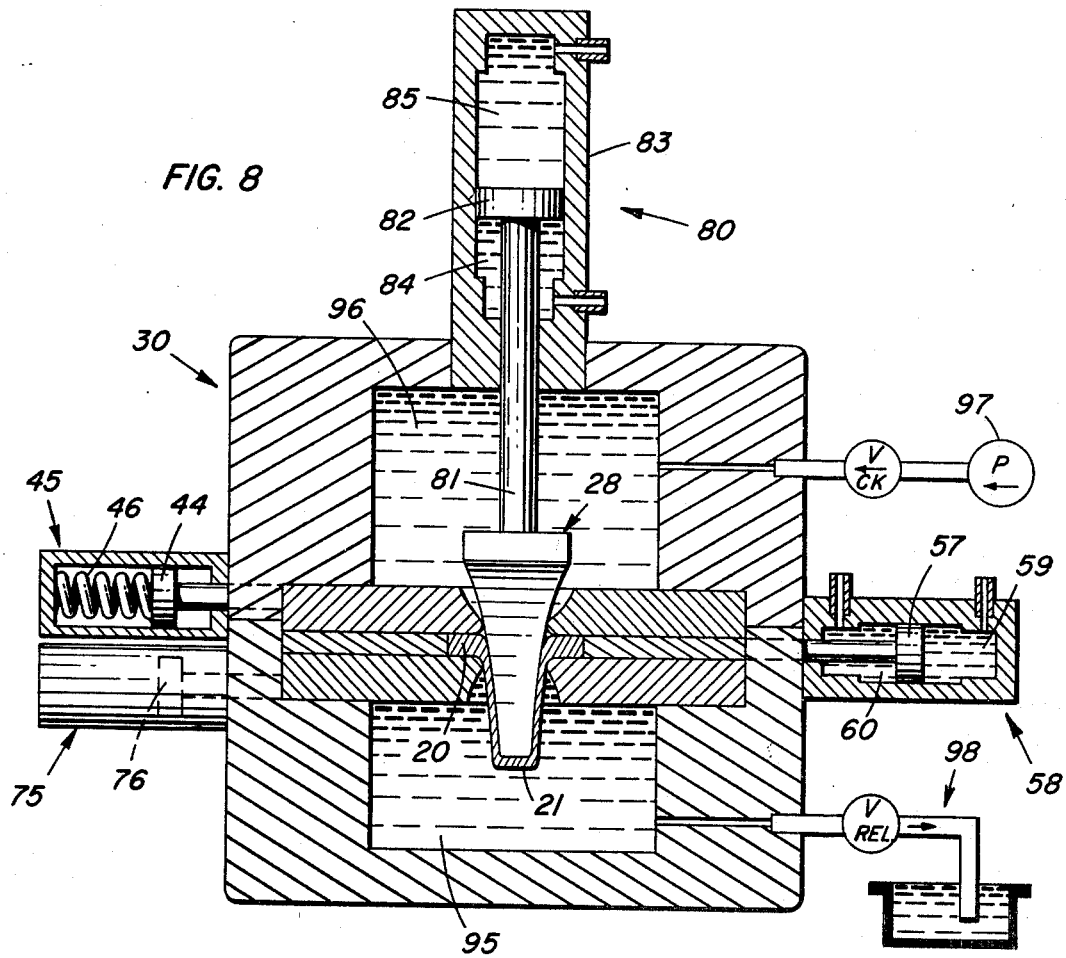
FIG. 8 is an elevational view, partly in section, of alternate apparatus for practicing certain methods of the present invention, which methods are particularly useful in the deep drawing of the less ductile or more brittle, solid plastic materials.

ALTERNATE APPARATUS OF FIG. 8 FOR PRACTICING CERTAIN OTHER METHODS OF THE PRESENT INVENTION

Blanks of many solid plastic materials can be deep drawn against the atmosphere as shown in FIG. 5; however, depending upon the ductility or brittleness of the specific solid plastic material to be deep drawn, or other factors such as the drawing rate desired or required, back pressure may be required or may prove beneficial, in achieving the desired increase in ductility for the deep drawing operation to be accomplished.

Accordingly, the deep drawing methods of the present invention may include the additional step of applying back pressure against the article as it is being drawn, and against the action of the mandrel. Further, the additional step of providing fluid pressure to the exposed top surface of the blank, may be employed to assist in placing the blank in high hydrostatic pressure, sufficiently high to achieve the required, or desired, increased ductility.

The deep drawing methods of the present invention including one or both of such additional steps, may be practiced by the alternate or modified apparatus of FIG. 8.

The apparatus of FIG. 8 is substantially the same as the apparatus of FIG. 5, and for simplicity, structural elements of FIG. 8 which are identical to the corresponding structural elements of FIG. 5, are numbered identically. The apparatus of FIG. 8 includes a modified split frame assembly 30 which provides a fluid filled, lower chamber 95 into which the article 21 is to be deep drawn, and a fluid filled, upper chamber 96 in communication with a suitable fluid pump 97 for providing pressurized fluid to the chamber 96.

Prior to the downward movement of the mandrel 28 into engagement with the blank 20, or in timed sequence therewith, the fluid pump 97 provides suitably pressurized fluid to the upper chamber 96, which pressurized fluid acts downwardly against the exposed top surface of the blank (see FIG. 4 for appreciation of exposed top blank surface) and tends to deflect the blank downwardly against the relatively incompressible fluid in the lower chamber 95.

The action assists and cooperates with the above-described action of the edge-pressure, iris die 24, in placing the blank in high hydrostatic pressure sufficiently high to achieve the required or desired increased ductility.

Upon the engagement of the mandrel 28 with the increasingly ductile blank 20, and the occurrence of the above-described methods of deep drawing as practiced by the apparatus of FIG. 5, the fluid in the lower chamber 95 will provide a back pressure against the deep drawing action. The back pressure will assist in maintaining the blank sufficiently, increasingly, ductile, by pushing back along the length of the deep drawing material against, or in opposition to, the action of the mandrel 28 and the contracting, edge-pressure iris die 24. It will be understood by those skilled in the art, that to accomplish the provision of such back pressure, the lower chamber 95 initially may be only partially filled with fluid; or, the lower chamber may be provided with a suitable relief valve operable at a predetermined pressure, a relief line and a sump, all indicated by the general numerical designation 98.

Figure 9:
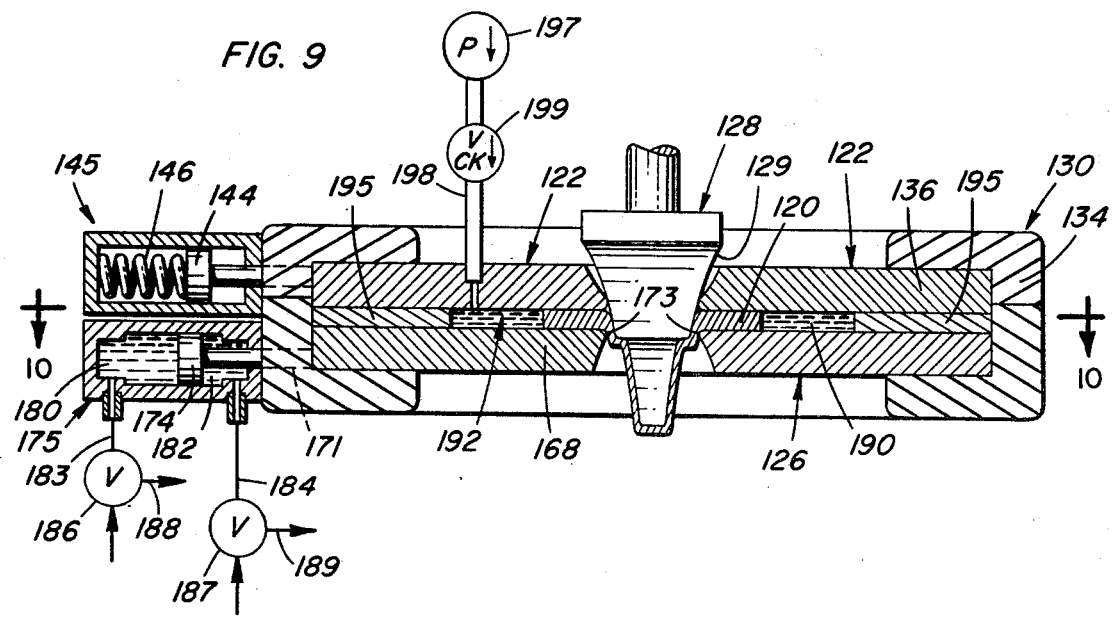
FIG. 9 is an elevational view, partly in section, of alternate apparatus for practicing certain methods of the present invention.
Figure 10:
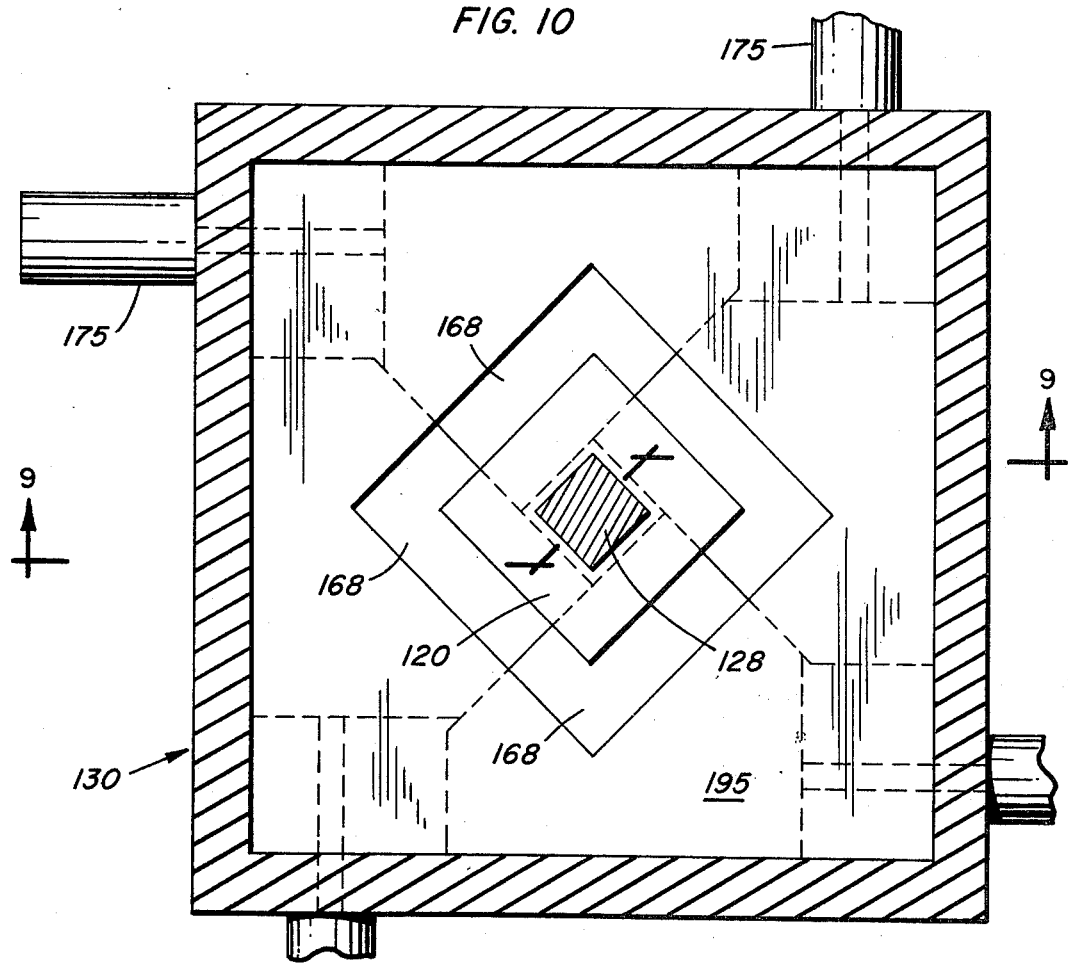
FIG. 10 is a modified sectional view taken substantially along the line 10—10 of FIG. 9 in the direction of the arrows.

ALTERNATE APPARATUS OF FIGS. 9 AND 10 FOR PRACTICING CERTAIN OTHER METHODS OF THE PRESENT INVENTION

Certain methods of the present invention may also be practiced by the apparatus of FIGS. 9 and 10, and which methods are particularly useful in drawing the stepped, horn-shaped article 121 of FIG. 2 from a blank of solid plastic material 120.

The apparatus of FIGS. 9 and 10 is substantially the same as the apparatus of FIG. 5, and for simplicity, structural elements of FIGS. 9 and 10 which are identical, or substantially identical, to the corresponding structural elements of FIG. 5, are numbered similarly.

Primarily, the apparatus of FIGS. 9 and 10 differs from that of FIG. 5, in that the force applied against the circumferential surface or edges of the blank 120 is applied by a body of pressurized fluid, rather than by the edge-pressure, iris die 24 of FIG. 5. Additionally, the outer surfaces 129 of the mandrel 128 are stepped as shown in FIG. 9, and the die blocks 168 comprising the forming, iris die 126, are fluid operated rather than being spring operated as are the die blocks 68 of FIG. 5.

More specifically, with regard to the forming, iris die 126, the piston or enlarged head portion 174 formed on the end of each force transmitting shaft 171 (FIG. 9), is slidably received within a double acting cylinder 175 suitably secured to the outer surface of the frame wall 134. The piston 174 divides the interior of the cylinder of the two chambers 180 and 182, respectively.

The chambers 180 and 182 are connected to suitable supplies of pressurized fluid (not shown) by supply lines 183 and 184, respectively, and through intermediate two-way control valves 186 and 187, respectively. The control valves are also connected to respective relief lines 188 and 189. The operation and control of the die blocks 168 by the double acting cylinders 175, with regard to the expansion and contraction of the forming, iris die 126, is the same, or substantially the same, as the operation and control of the die blocks 47 by the double acting cylinders 58, with regard to the expansion and contraction of the edge-pressure, iris die 24 of FIG. 5.

Referring now to the application of force to the circumferential surface or edges of the blank 120, such force is applied by the body of pressurized fluid 190 residing within the fluid chamber 192. The fluid chamber 192 is defined by an insert 195 (which resides between the hold-down, iris die 122 and the forming, iris die 126), portions of the bottom surfaces of the die blocks 138, portions of the top surfaces of the die blocks 168, and the circumferential surface or edges of the blank 120. As may be best seen in FIG. 10, the insert 195 is a unitary structure which is provided with a central opening which is generally complementary to the circumferential surface or edge of the blank 120. The central opening, in order to define the fluid chamber 192, is larger than the outer confines of the blank 120 by a predetermined amount.

The fluid chamber 192 is connected to a suitable fluid pump 197 by a suitable flexible supply line 198 and through an intermediate check valve 199.

OPERATION OF APPARATUS OF FIGS. 9 AND 10 IN PRACTICING CERTAIN METHODS OF THE PRESENT INVENTION

It will be assumed that the blank of solid plastic material 120 has been positioned between the hold-down iris die 122 and the forming, iris die 126, and substantially centrally of the opening formed centrally of the insert 195. It will be further assumed that, in a predetermined time sequence, pressurized fluid has been admitted to the fluid chamber 192, that the mandrel 128 has been advanced downwardly into the hold-down, iris die 122 and into engagement with the top surface of the blank 120, and that the pressure control valves 186 and 187, associated with the forming, iris die 126, have been appropriately aligned to relieve fluid from the chambers 180 and to admit pressurized fluid into the fluid chambers 182, so as to suitably expand the forming, iris die.

The pressurized fluid 190 in the fluid chamber 192 will apply force against the circumferential surface or edges of the blank 120, and this fluid force, in cooperation with the force applied to the blank by the continuously advancing mandrel 128 and the reactive forces applied by the iris dies 122 and 126, will place the blank in high hydrostatic pressure sufficiently high to cause the blank to increase in ductility, or de-form without fracture, and to flow between the opening between the mandrel surfaces 129 and the forming edges 173 of the forming, iris die 126.

The control valves 186 and 187, associated with the forming, iris die 126, will be suitably aligned and appropriately pressurized fluid will be admitted into the chambers 182, to maintain the spacing between the tapered surfaces 128 of the advancing mandrel and the expanding, forming iris die 126, at a predetermined distance less than the thickness of the undrawn blank 120.

The stepped portion of the drawn article is formed by stopping the advancement of the mandrel 128 when the lower tapered portion of the article has been formed or drawn, and by admitting additional pressurized fluid into the chambers 182 to expand the forming, iris die 126, a predetermined amount. When the forming, iris die has been suitably expanded, additional pressurized fluid is admitted into the fluid chamber 192, the mandrel is again advanced downwardly, and additional pressurized fluid is admitted into the chambers 182 to continuously expand the forming, iris die to form or draw the upper tapered portion of the article 121. The flange portion of the article 121 may be provided in the manner taught hereinabove.

Figure 12:
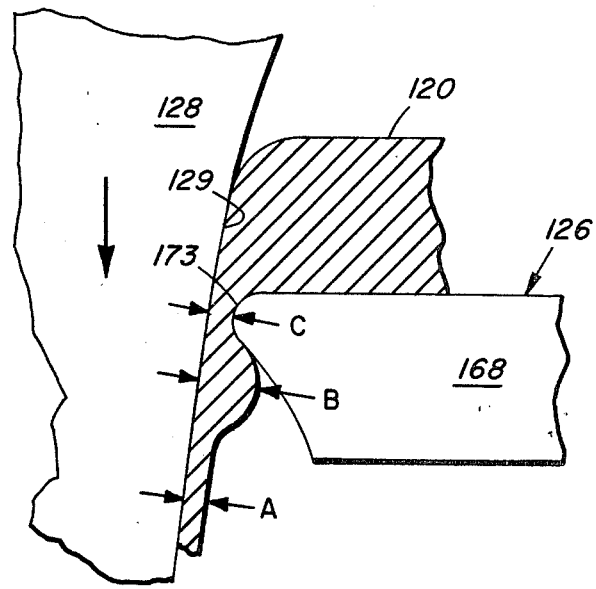

Referring again to the operation of the fluid-operated forming, iris die 126 of FIG. 9, the method step of controlling the thickness of the drawn walls, to provide drawn walls of varying thickness as shown in FIG. 12, will be set forth.

With reference to FIG. 9, it will be assumed that the mandrel 128 is advancing continuously downwardly, that the forming, iris die is being expanded continuously, and that the blank 120 is flowing between the space between the mandrel surfaces 129 and the forming die edges 173. It will be further assumed that the opening of the forming, iris die, or the spacing between the mandrel surfaces 129 and the forming die edges 173, is such that the walls of the drawn articles are being provided with the wall thickness shown at A. While the mandrel 128 is continuously advancing, and the increasing ductile blank 120 is flowing, the control valves 186 and 187 will be suitably aligned to admit additional pressurized fluid into the fluid chambers 182 and suitably further relieve fluid chambers 180, to further expand the forming, iris die 126, and to increase the spacing between the mandrel surfaces 129 and the forming die edges 173 thereby providing the drawn walls with the thickness shown at B.

To provide the drawn walls with the thickness shown at C, it will be understood, that the control valves 186 and 187 will be suitably aligned to contract the forming, iris die to provide the drawn walls with the thickness shown at C.

It will be further understood, that the expressions "expand the forming, iris die" and "contract the forming, iris die," are used in the context of providing relatively larger or relatively smaller spacing between the surfaces 129 of the continuously downwardly advancing mandrel, and the forming die edges 173, of the, generally, continuously expanding forming, iris die 126.

It will be further understood by those skilled in the art, that the apparatus of FIGS. 9 and 10 may be modified to include the fluid filled lower chamber 95 and fluid filled upper chamber 96, shown in FIG. 8. So modified, the deep drawings methods which may be practiced by the apparatus of FIGS. 9 and 10, would include the additional step of applying back pressure against the article as it is being drawn, and/or the additional step of providing fluid pressure to the top surface of the blank as the article is being drawn.

General

It will be understood by those skilled in the art, that the apparatus of FIG. 4 and the apparatus of FIG. 8 could be provided with a fluid-operated, forming, iris die as shown in FIG. 9, and that such other apparatus could be used to practice deep drawing methods including the method step of providing the drawn walls with varying thicknesses.

It will be further understood by those skilled in the art, that with regard to the above-described apparatus for practicing methods of the present invention, and which apparatus employ fluid pressures, suitable fluid seals would be provided at appropriate points, as required. It will further be understood that the need for seals can be substantially, if not completely, eliminated by the use of soft solids, instead of fluids in the application of fluid pressure, or that extremely viscous fluids may be employed which require no fluid seals.

Additionally, it will be understood by those skilled in the art, that instead of accomplishing the relative positionment of the above-described structural elements by securing the halves of the split frame 30, or 130, together with bolts, the upper half of the split frame could be mounted on the downwardly movable ram of a conventional press, and the lower half of the split frame could be mounted on the bolster plate of the press. The downward movement of the ram could be utilized to secure the halves of the split frame together and to operate the mandrel.

Figure 11:
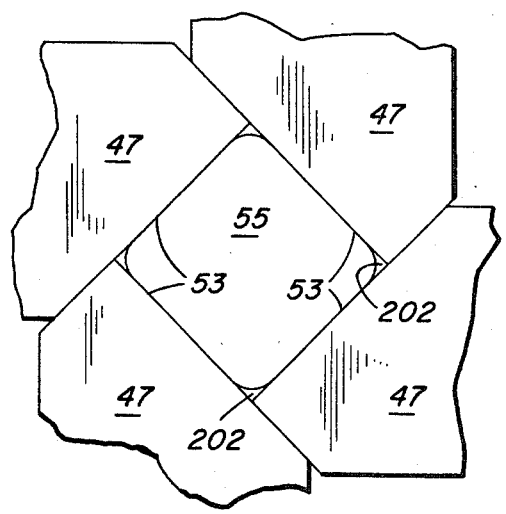
FIG. 11 is a view of an alternate edge-pressure, iris die with the die edges provided with rounded portions.

Further, it will be understood by those skilled in the art, that the die edges 53 of the above-described edge-pressure, iris die 24, may be provided with rounded portions 202, as shown in FIG. 11, to provide the drawn articles 21 and 121, of FIGS. 1 and 2, respectively, with the rounded corners as shown. For convenience, the rounded portions 202 may be separate inserts and not integral with the die blocks 47, and may be suitably secured to the die blocks such as by complementary dovetailing. In the manner well known in the art, the blanks for use with such a modified edge-pressure, iris die, would be appropriately pretrimmed.

Also, it will be understood by those skilled in the art that the expression "high hydrostatic pressure" is a relative term, and that depending upon the ductility or brittleness of the material being drawn, the depth of the draw, a greater or less amount of hydrostatic pressure will be required to permit the desired degree of deformation without workpiece fracture. The level of this hydrostatic pressure is that which increases the ductility of the material sufficiently to permit the desired deformation thereof without fracture. The actual level of hydrostatic pressure required, for a given deep draw in view of the immediately foregoing considerations, can be determined empirically by performing several deep drawing operations on a series of identical blanks with successively increased pressures, observing the quality of the deep draw as to the presence or absence of fracture and control of wall thickness, and increasing the amount of applied "high hydrostatic pressure" accordingly.

It will be further understood by those skilled in the art that the expression "deep drawing," or "deep draw," is a term of art connoting a general class of methods for forming metals and other materials, into cupped, shell-like, or tubular configurations, and that the use of the methods of the present invention are equally applicable and advantageous to perform what to some could be considered to be a "shallow draw." Further, it will be understood, that the expression "deep drawing," or "deep draw," is used in a qualitative sense, that for example, the drawing of a blank of titanium to a depth of one-fourth (¼) inch, would, due to the brittleness of titanium, be a "deep draw."

Manifestly, many modifications and adaptations may be made in the present invention without departing from the spirit and scope thereof.

What is claimed is:

1. The method of deep drawing a blank of solid plastic material to form an article having a varying cross-sectional configuration, which comprises the steps of:
   applying inwardly directed force to the entire circumferential edge surface of said blank and applying force to the central portion of said blank to subject said blank to high hydrostatic pressure sufficiently great to cause said blank to increase in ductility; and forcing said blank while increasingly ductile, inwardly and through a variable opening die while varying the opening of the die as said blank is being drawn therethrough to vary the cross-sectional configuration of said article.

2. The method of deep drawing a blank of solid plastic material, which comprises the steps of:
   applying inwardly directed force to the entire circumferential edge surface of said blank;
   confining portions of the upper and lower surfaces of said blank to provide reactive forces to said blank in response to the force applied to said circumferential surface;
   applying a force to the central portion of said blank;
   the combination of said applied and reactive forces being sufficiently great to place said blank in high hydrostatic pressure and to cause said blank to increase in ductility; and
   forcing said blank inwardly, with said combined forces while said blank is increasingly ductile, and through a forming die which varies in size as said blank is forced therethrough.

3. The method of deep drawing a blank of solid plastic material into an article of varying cross-sectional configuration and for controlling the thickness of the walls of the drawn article, which comprises the steps of:
   positioning said blank between a hold-down, iris die and a forming, iris die;
   applying pressure to the entire circumferential edge surface of said blank;
   applying pressure to said blank in opposition to said circumferentially applied pressure;
   the combination of said applied pressures being sufficiently great to place said blank in high hydrostatic pressure and to cause said blank to increase in ductility sufficiently to permit said blank to be deep drawn without fracture; and
   deep drawing said blank, while increasingly ductile, inwardly through said forming iris die while varying the size of the opening of said forming iris die.

4. The method of deep drawing according to claim 3 wherein said pressure applied to said circumferential edge surface of said blank is applied by a contracting edge-pressure, iris die.

5. The method of deep drawing according to claim 3 wherein said pressure applied to said circumferential edge surface of said blank is applied by a body of pressurized fluid.

6. The method of deep drawing according to claim 3 wherein said opposition pressure is applied by a mandrel acting against said blank.

7. The method of deep drawing according to claim 3 and including the additional step of providing back pressure to said blank to assist in maintaining said blank in high hydrostatic pressure.

8. The method of deep drawing according to claim 7 and including the additional step of providing fluid pressure to the top of said blank.

9. The method of deep drawing a blank of solid plastic material into an article of varying cross-sectional configuration and for providing the drawn walls of the article with a stepped portion, which comprises the steps of:
   positioning said blank between a hold-down, iris die and a forming, iris die;
   applying pressure to the entire circumferential edge surface of said blank;
   applying pressure to said blank in opposition to said circumferentially applied pressure;
   the combination of said applied pressures being sufficiently great to place said blank in high hydrostatic pressure and to cause said blank to increase in ductility sufficiently to permit said blank to be deep drawn without fracture;
   deep drawing said blank, while increasingly ductile, inwardly through said forming iris die while varying the size of the opening of said forming iris die;
   halting the deep drawing of said article and further expanding said forming, iris die; and
   resuming said deep drawing.

10. The method of deep drawing a blank of solid plastic material into an article of varying cross-sectional configuration and for providing the walls of the drawn article with varying thicknesses, which comprises the steps of:
    positioning said blank between an expandable hold-down, iris die and an expandable, fluid operated, forming, iris die;
    applying pressure to the entire circumferential edge surface of said blank;
    applying pressure to said blank, in opposition to said circumferentially applied pressure, with a continuously advancing mandrel, of varying cross-sectional configuration, and which mandrel is passing through the openings of said iris dies;

expanding said fluid operated, forming, iris die to provide spacing between said forming, iris die and said continuously advancing mandrel;

said iris dies, in response to said applied pressures, providing reactive pressures to said blank;

the combination of said applied and reactive pressures being sufficiently great to place said blank in high hydrostatic pressure and to cause said blank to increase in ductility sufficiently to permit said blank to be deep drawn into said spacing without fracture; and deep drawing said blank, while increasingly ductile, inwardly through said spacing between said continuously advancing mandrel and said expanding, forming, iris die while varying the size of said spacing by controlling the opening of said expanding, forming, iris die relative to the configuration of the continuously advancing mandrel.

11. The method of deep drawing a blank of solid plastic material, said blank having an edge, which comprises the steps of:

subjecting said blank to high hydrostatic pressure with inwardly directed compressive forces applied by mechanical members to said edge, said forces being sufficiently great to cause said blank to increase in ductility, and forcing said blank inwardly through a forming die to deep draw said blank while said blank is increasingly ductile.

12. The method of deep drawing a blank of solid plastic material, which comprises the steps of:

mechanically applying force to the entire edge surface of said blank with a contracting iris die;

confining the top and bottom surfaces of said blank to provide reactive forces to said blank in response to the force applied to said blank edge surface;

applying a force to said blank to tend to draw said blank through a forming die; and the combination of said applied and said reactive forces being sufficiently great to cause said blank to increase in ductility and to deep draw said blank inwardly through a forming die while said blank is increasingly ductile.

13. The method of deep drawing a blank of solid plastic material, which comprises the steps of:

mechanically applying force to the entire edge surface of said blank with a contracting iris die;

confining the top and bottom surfaces of said blank between mechanical members, to provide reactive forces to said blank in response to the force applied to said blank edge surface;

mechanically applying force to the central portion of said blank to tend to draw said blank through a forming die and to provide force to said blank in opposition to the force applied thereto by said mechanically applied edge force; and the combination of said applied and said reactive forces being sufficiently great to cause said blank to increase in ductility sufficiently to deform without fracture, and to draw said blank inwardly through said forming die while said blank is increasingly ductile.

14. The method according to claim 13 and including the additional step of providing back pressure to said blank to assist in causing said blank to increase in ductility.

15. A method according to claim 6 wherein controlling the thickness of the walls of the drawn article is accomplished by:

controlling the position of the surfaces of said mandrel with respect to said forming, iris die.

References Cited

UNITED STATES PATENTS

| | | | |
|---|---|---|---|
| 2,847,957 | 8/1958 | Watter et al. | 72—56 |
| 3,172,928 | 3/1965 | Johnson | 72—56 |
| 3,303,806 | 2/1967 | Whiteford | 113—120 |
| 3,314,275 | 4/1967 | Mullen | 72—350 |
| 1,530,000 | 3/1925 | Kauffmann | 72—347 |

RICHARD J. HERBST, Primary Examiner

U.S. Cl. X.R.

72—347